US008687907B2

(12) United States Patent
Toyoda et al.

(10) Patent No.: US 8,687,907 B2
(45) Date of Patent: Apr. 1, 2014

(54) IMAGE PROCESSING APPARATUS AND IMAGE PROCESSING METHOD

(75) Inventors: Yuushi Toyoda, Kawasaki (JP); Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 203 days.

(21) Appl. No.: 13/182,831

(22) Filed: Jul. 14, 2011

(65) Prior Publication Data

US 2011/0268368 A1 Nov. 3, 2011

Related U.S. Application Data

(63) Continuation of application No. PCT/JP2009/051379, filed on Jan. 28, 2009.

(51) Int. Cl.
*G06K 9/40* (2006.01)
(52) U.S. Cl.
USPC ............................ 382/254; 382/263; 382/264
(58) Field of Classification Search
CPC ............................................. G06T 2207/20182
USPC ......... 382/165, 167, 190, 199, 219, 220, 250, 382/251–252, 255–256, 260–266; 348/607, 348/610, 615, 622, 625, 627
See application file for complete search history.

(56) References Cited

U.S. PATENT DOCUMENTS

| | | | | | |
|---|---|---|---|---|---|
| 5,050,223 | A | * | 9/1991 | Sumi | 382/266 |
| 5,805,721 | A | * | 9/1998 | Vuylsteke et al. | 382/128 |
| 6,169,823 | B1 | * | 1/2001 | Takeo et al. | 382/308 |
| 6,285,798 | B1 | * | 9/2001 | Lee | 382/260 |
| 6,611,627 | B1 | * | 8/2003 | LaRossa et al. | 382/240 |
| 6,628,842 | B1 | | 9/2003 | Nagao | |
| 6,735,330 | B1 | * | 5/2004 | Van Metter et al. | 382/132 |
| 7,433,536 | B2 | * | 10/2008 | Kim | 382/266 |
| 7,602,447 | B2 | * | 10/2009 | Arici et al. | 348/687 |
| 2002/0047911 | A1 | * | 4/2002 | Tsuchiya et al. | 348/252 |
| 2004/0096103 | A1 | * | 5/2004 | Gallagher et al. | 382/167 |
| 2004/0252907 | A1 | | 12/2004 | Ito | |
| 2007/0182834 | A1 | | 8/2007 | Yokoyama et al. | |
| 2008/0199100 | A1 | * | 8/2008 | Ishiga | 382/263 |

FOREIGN PATENT DOCUMENTS

| | | |
|---|---|---|
| JP | 2000-105815 | 4/2000 |
| JP | 2001-5960 | 1/2001 |
| JP | 2003-134352 | 5/2003 |
| JP | 2005-234001 | 9/2005 |

(Continued)

OTHER PUBLICATIONS

Yuki Ishii et al., "Josangata Kokkaku/Texture Gazo Bunri no Gazo Shori eno Oyo", The Transactions of the Institute of Electros, Jul. 1, 2007, col. J90-D No. 7, pp. 1682-1685.

(Continued)

*Primary Examiner* — Andrae S Allison
(74) *Attorney, Agent, or Firm* — Staas & Halsey LLP

(57) ABSTRACT

An image processing apparatus creates a basic-structure component image representing an image that an input image except edge is smoothed while preserving the edge in the input image; and creates a detail component image representing an image that the basic-structure component image is subtracted from the input image. Subsequently, the image processing apparatus decomposes the detail component image into a plurality of frequency-band images through multiresolution transform processing, and performs noise removal on the obtained frequency-band images. After that, the image processing apparatus performs inverse multiresolution transform processing of combining the noise-removed frequency-band images, thereby creating a noise-removed detail-component image.

6 Claims, 9 Drawing Sheets

(56) References Cited

FOREIGN PATENT DOCUMENTS

| | | |
|---|---|---|
| JP | 2006-246200 | 9/2006 |
| JP | 2006-309749 | 11/2006 |
| JP | 2006-310999 | 11/2006 |
| JP | 2007-188391 | 7/2007 |
| JP | 2007-316983 | 12/2007 |
| WO | WO 03/036939 A1 | 5/2003 |
| WO | WO 2007/116543 A1 | 10/2007 |

OTHER PUBLICATIONS

Yuki Ishii et al., "Josangata Kokkaku/Texture Bunri no Zatsuon Taisei to Gazo Zatsuon Jokyo eno Oyo", Eizo Media Shori Symposium Dai 11 Kai Symposium Shiryo, Nov. 8, 2006 pp. 29-30.

* cited by examiner

ORIGINAL SIGNAL

BASIC STRUCTURE COMPONENT + DETAIL COMPONENT

BASIC STRUCTURE COMPONENT + DETAIL COMPONENT (LOW FREQUENCY COMPONENT) + DETAIL COMPONENT (HIGH FREQUENCY COMPONENT)

BASIC STRUCTURE COMPONENT + DETAIL COMPONENT (LOW FREQUENCY COMPONENT) + DETAIL COMPONENT (HIGH FREQUENCY COMPONENT)

BASIC STRUCTURE COMPONENT + DETAIL COMPONENT

ORIGINAL SIGNAL

LOW FREQUENCY
COMPONENT

HIGH FREQUENCY
COMPONENT

LOW FREQUENCY
COMPONENT

HIGH FREQUENCY
COMPONENT

⇐ RINGING

IMAGE PROCESSING APPARATUS AND IMAGE PROCESSING METHOD

CROSS-REFERENCE TO RELATED APPLICATIONS

This application is a continuation of International Application No. PCT/JP2009/051379, filed on Jan. 28, 2009, the entire contents of which are incorporated herein by reference.

FIELD

The embodiments discussed herein are directed to an image processing apparatus, an image processing program, and an image processing method by which noise in an input image is removed.

BACKGROUND

Conventionally, various image processing technologies of removing noise in an input image have been developed. For example, a simple smoothing filter is simple in method, and can be designed at low cost, so that it has been employed by a number of image devices. Moreover, according to the simple smoothing filter, an edge signal of an object is smoothed together, therefore, a filter that smoothes anything other than the edge (an edge-preserved smoothing filter) has been recently developed.

According to the edge-preserved smoothing filter, filtering processing is executed by weighting peripheral pixels to be applied to the smoothing filter in accordance with a difference in pixel level from a pixel to be smoothed. In other words, according to the edge-preserved smoothing filter, the filtering processing is performed on peripheral pixels with small level differences from pixels to be smoothed by assigning a relatively large weight, and on peripheral pixels with large level differences by assigning a relatively small weight, or setting the weight to zero.

However, according to a conventional smoothing filter, when there are fine gradation information and an edge (for example, a boundary between a bright part and a dark part) in the same band that includes a noise component to be removed, they are to be removed together with the noise. Moreover, according to the edge-preserved smoothing filter having the edge-preserving function described above, its effect can be obtained when the fine gradation information and the edge have an amplitude equal to or larger than the amplitude of a noise component; however, information having an amplitude smaller than the amplitude of the noise component is to be removed. In terms of quality, discontinuous gradation is sometimes produced in a smooth area in some cases.

As a technology of removing such noise, a noise removal technology that uses a frequency filter, such as a wavelet transform, has been known. For example, by using the wavelet transform, an input image (original image) is separated into a plurality of frequency bands, and threshold processing (coring) is performed in each of the frequency bands. According to the wavelet transform, an optimal threshold can be adjusted by band of frequency, so that noise removal can be performed while keeping a high image quality, compared with a real space filter, such as a smoothing filter.

Patent Document 1: Japanese Laid-open Patent Publication No. 2000-105815
Patent Document 2: Japanese Laid-open Patent Publication No. 2006-310999
Patent Document 3: Japanese Laid-open Patent Publication No. 2005-234001

However, according to the above conventional technologies, there is a problem that ringing occurs and degrades the image quality, or the image quality of a noise-removed image is poor, consequently, noise removal with high precision may not be achieved.

For example, according to a noise removal technology by multiresolution transform processing using such as the wavelet transform, resulting from noise removal, an artifact called ringing is produced around a steep edge having a large change in pixel level value. A cause of occurrence of ringing is explained below by using an example that an image is represented by a one-dimensional signal, as depicted in FIG. 9A. Each of FIGS. 9A to 9D is a schematic diagram that schematically depicts a graph in which the axis of ordinate represents pixel value (for example, the value of brightness), and the axis of abscissa represents the position of pixel.

According to the multiresolution transform processing described above, as depicted in FIG. 9B, an input image (an original signal in FIG. 9A) is separated into two signals, namely, a low frequency component and a high frequency component, by performing the wavelet transform on the input image. For the purpose of simplifying explanation, described here is the example of separating into two signals of a low frequency component and a high frequency component; however, it can be separated into signals in a plurality of frequency bands. After noise removal is performed only on the separated high frequency component as depicted in FIG. 9C, an inverse wavelet transform using the separated low frequency component and the noise-removed high frequency component is performed as depicted in FIG. 9D, and then a noise-removed image is obtained.

In this way, according to the noise removal through the multiresolution transform processing, a small amplitude of a high frequency component obtained by separation is to be turned smaller or to be turned to zero, therefore, a reconstructed signal basically represents directly a signal form of a low frequency component of which amplitude is not reduced. A signal of a rectangular wave of, such as an edge in image, can be expressed only as a composite wave of a plurality of frequency-band signals in a complicated shape. When an input signal is a signal having a steep edge with a large change in pixel level value, the input signal is separated into a high frequency component and a low frequency component as depicted in FIG. 9B, so that a change in the low frequency component around the edge that is not observed in the original signal appears as "a change as like waves in the brightness value (ringing)" in a reconstructed signal. In other words, performing noise removal processing using the multiresolution transform processing on an image having a steep edge with a large change in pixel level value leads to occurrence of ringing.

Moreover, a noise removal technology using a real space filter, such as the smoothing filter or the edge-preserved smoothing filter described above, can prevent occurrence of ringing described above. However, according to the noise removal technology using a real space filter, coring processing (optimal signal control band by band of frequency) may not be performed as performed by the noise removal technology using a frequency filter, such as the wavelet transform. Therefore, the image quality of an image obtained by the noise removal technology using a real space filter is not as good as the image quality by the noise removal technology using a frequency filter.

SUMMARY

According to an aspect of an embodiment of the invention, a An image processing apparatus that removes noise from an input image includes an edge-preserved smoothing processing unit that creates a basic-structure component image representing an image that the input image except edge is smoothed while preserving the edge in the input image; a difference processing unit that creates a detail component image representing an image that the basic-structure component image created by the edge-preserved smoothing processing unit is subtracted from the input image; a multiresolution transform processing unit that performs multiresolution transform processing of decomposing the detail component image created by the difference processing unit into a plurality of frequency-band images; a noise removing processing unit that performs noise removal on the frequency-band images created by the multiresolution transform processing unit; and an inverse multiresolution transform processing unit that performs inverse multiresolution transform processing of combining the frequency-band images from which noises are removed by the noise removing processing unit, thereby creating a noise-removed detail-component image.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The following description explains an overview of an image processing apparatus according to the embodiments, a configuration of the image processing apparatus, and a flow of processing, in order, and finally explains various modifications of the embodiments.

[a] First Embodiment

Over View of Image Processing Apparatus

Main terms used in the embodiments are explained below.

An "image processing apparatus" used in the embodiments (corresponding to "an image processing apparatus" described in the claims) is an effective technique of noise removal from digital image regardless of moving image or still image. The image processing apparatus outputs a noise-removed image, for example, to a dynamic range device that creates an image by performing dynamic range compression for clearing, such as an image taken against light.

Moreover, the dynamic range device calculates a low frequency component and a high frequency component of an input image that is a processing subject from the input image or a smoothed image, and performs dynamic range compression by using the calculated low frequency component and the calculated high frequency component, thereby creating (reconstructing) an input image in which noise is removed. Here, the low frequency component is the level value of a pixel on an input image or a smoothed image; and the high frequency component is a difference between the level value of a pixel on the input image and the level value of a pixel on the smoothed image at a position corresponding to the pixel on the input image.

Figure 1A:
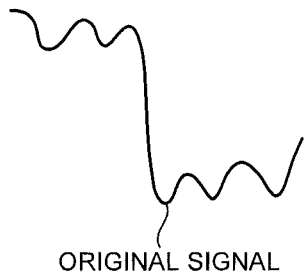
FIG. 1A is a schematic diagram that depicts an example of an image (input signal) that is input into an image processing apparatus according to a first embodiment.
Figure 1B:
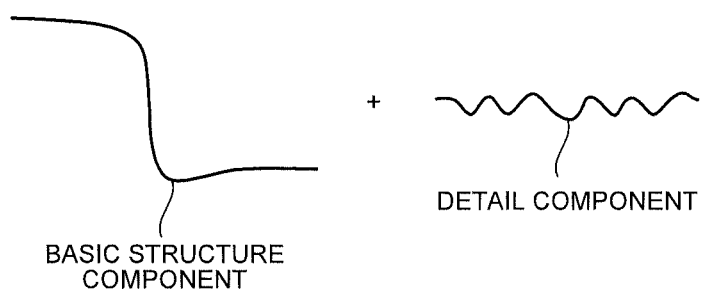
FIG. 1B is a schematic diagram of an example that an input image is decomposed into a basic-structure component image and a detail component image.
Figure 1C:
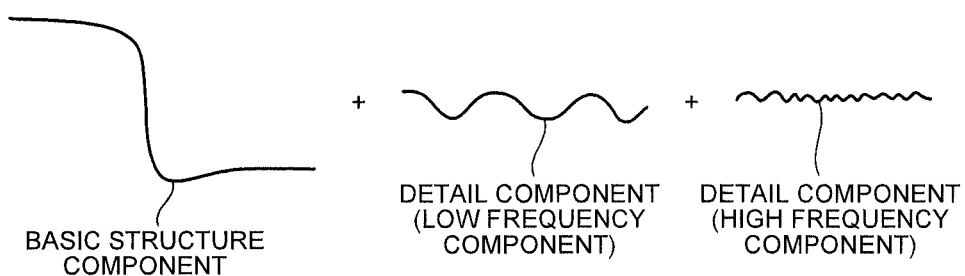
FIG. 1C is a schematic diagram that depicts an example of a result of performing multiresolution transform processing on the detail component image obtained by decomposing.
Figure 1D:
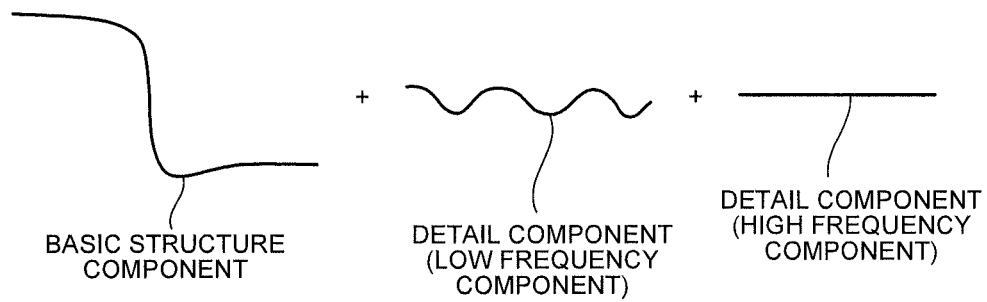
FIG. 1D is a schematic diagram that depicts an example of a result of performing noise removal on the image on which the multiresolution transform processing is performed.
Figure 1E:
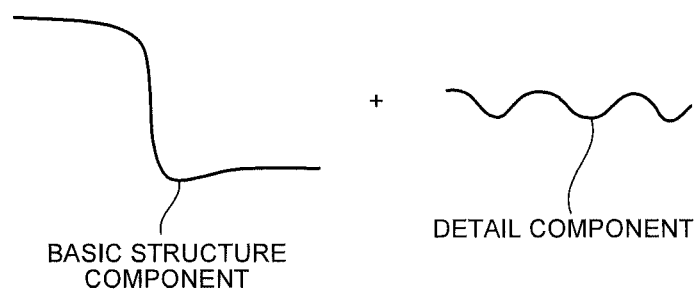
FIG. 1E is a schematic diagram that depicts an example that the inverse multiresolution transform is performed.

An overview of an image processing apparatus according to a first embodiment is explained below with reference to FIGS. 1A to 1E. It is explained below by using an example that an image is represented by a one-dimensional signal. FIG. 1A is a schematic diagram that depicts an example of an image (input signal) that is input into the image processing apparatus according to the first embodiment; and FIG. 1B is a schematic diagram of an example that an input image is decomposed into a basic-structure component image and a detail component image. FIG. 1C is a schematic diagram that depicts an example of a result of performing multiresolution transform processing on the detail component image obtained by decomposing; FIG. 1D is a schematic diagram that depicts an example of a result of performing noise removal on the image on which the multiresolution transform processing is performed; and FIG. 1E is a schematic diagram that depicts an example that an inverse multiresolution transform is performed. Each figure of FIGS. 1A to 1D is a schematic diagram that schematically depicts a graph on which the axis of ordinate represents pixel value (for example, the value of brightness), and the axis of abscissa represents the position of pixel. The position of pixel means, for example, a position when looking at the image frame along a line direction at an arbitrary position.

Briefly describing, the image processing apparatus according to the first embodiment removes noise in an input image, particularly, noise removal with high precision can be achieved while preventing occurrence of ringing.

Specifically, for example, when an image depicted in FIG. 1A is input, the image processing apparatus creates a basic-structure component image that the input image except edge is smoothed while preserving the edge in the input image, and part with a large difference (large change) in adjacent pixel values is left in the input image. Subsequently, as depicted in FIG. 1B, the image processing apparatus subtracts the basic-structure component image from the input image, thereby creating a detail component image that the part with a large difference in adjacent pixel values is removed in the input image.

The image processing apparatus then, as depicted in FIG. 1C, performs the multiresolution transform processing of decomposing the created detail-component image into a plurality of frequency-band images, thereby decomposing the detail component image into a low frequency component and a high frequency component. As the detail component image is decomposed, the input image is decomposed into "a basic structure component", "a detail component image (low frequency component)", and "a detail component image (high frequency component)".

After that, as depicted in FIG. 1D, for example, the image processing apparatus performs noise removal on a high frequency component among the created frequency-band images, thereby removing small noises (for example, a small noise that is difficult to sense) present in the input image. The image processing apparatus then, as depicted in FIG. 1E, performs an inverse multiresolution transform of combining the noise-removed frequency-band images, thereby creating a noise-removed detail-component image.

In this way, the image processing apparatus according to the first embodiment separates a basic-structure component image that includes a steep edge with large change in pixel level value and a gradual change in level value, and a detail component image that mainly includes noise and fine gradation change in image other than the basic-structure component image, prior to multiresolution transform processing using such as the wavelet transform. After that, the image processing apparatus according to the first embodiment performs noise removal through the multiresolution transform processing using such as the wavelet transform on the detail component image that mainly includes noise and fine gradation change in image.

In other words, the image processing apparatus according to the first embodiment can perform noise removal on a high frequency image that mainly includes noise and does not include part with a large level change, such as an edge in image, as a result, noise removal with high precision can be achieved while preventing occurrence of ringing.

Configuration of Image Processing Apparatus

Figure 2:
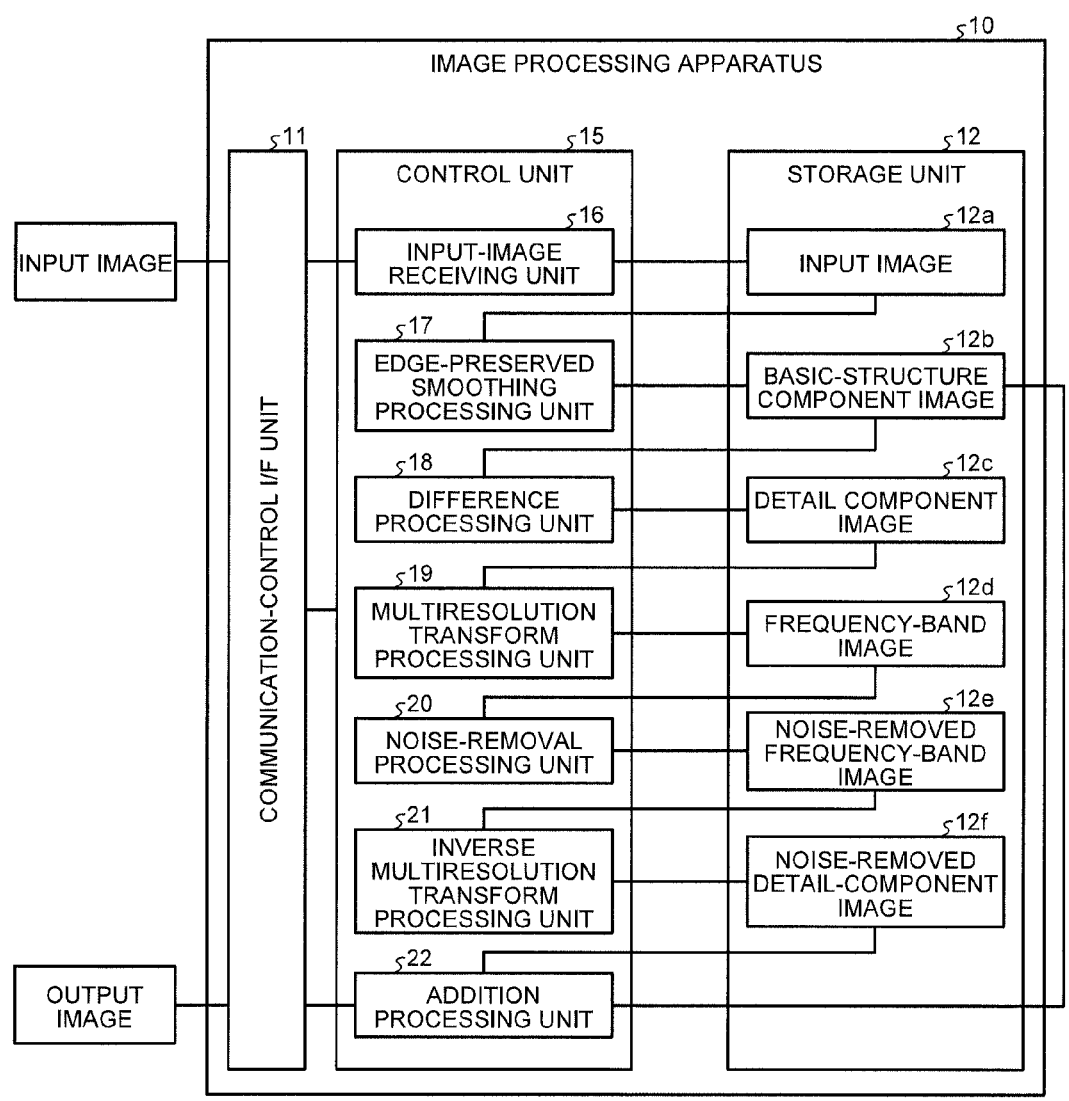
FIG. 2 is a functional block diagram that depicts a configuration of the image processing apparatus according to the first embodiment.

A configuration of the image processing apparatus according to the first embodiment is explained below with reference to FIG. 2. FIG. 2 is a functional block diagram that depicts a configuration of the image processing apparatus according to the first embodiment. As depicted in FIG. 2, an image processing apparatus 10 according to the first embodiment includes a communication-control interface (I/F) unit 11, a storage unit 12, and a control unit 15.

In addition to the processing units depicted in the drawings, the image processing apparatus 10 can include, for example, an input unit, an output unit, and a media receiving unit. The input unit is a processing unit that includes a keyboard, a mouse, a microphone, and the like, and receives input of various kinds of information. The output unit is a processing unit that achieves a pointing device function by cooperating with the mouse, and includes a monitor (or a display, or a touch panel), and a speaker. The media receiving unit is a processing unit that receives a storage medium (for example, Compact Disk (CD), a Digital Versatile Disk (DVD), a Hard Disk Drive (HDD), and the like) in which an input image is stored, reads an input image from the storage medium, and outputs it to the control unit 15.

The communication-control I/F unit 11 is an interface that controls wire communication or wireless communication with other devices. For example, the communication-control I/F unit 11 receives an input image via a network, such as the Internet, and outputs a noise-removed image created by the control unit 15 to a connected dynamic range device.

The storage unit 12 stores therein data and a program needed for various kinds of processing by the control unit 15, and particularly stores therein images created by respective control units of the control unit 15, which will be described later. For example, the storage unit 12 stores therein an input image 12a, a basic-structure component image 12b, a detail component image 12c, a frequency-band image 12d, a noise-removed frequency-band image 12e, a noise-removed detail-component image 12f, and the like.

The control unit 15 includes an internal memory for storing a control program, such as an operating system (OS), programs that define process procedures of various kinds of processing, and needed data. The control unit 15 includes an input-image receiving unit 16, an edge-preserved smoothing processing unit 17, a difference processing unit 18, a multi-resolution transform processing unit 19, a noise-removal processing unit 20, an inverse multiresolution transform processing unit 21, and an addition processing unit 22; and executes various kinds of processing with them.

The input-image receiving unit 16 reads an input image input into the image processing apparatus 10, and stores it into the storage unit 12. Specifically, for example, the input-image receiving unit 16 receives an input image received by the communication-control I/F unit 11, and/or an input image that is received by a not-depicted media receiving unit and read, and stores it into the storage unit 12 as the input image 12a. The input image can be either a moving image or a still image, and can be either color or monochrome.

The edge-preserved smoothing processing unit 17 creates a basic-structure component image representing an image that the input image except edge is smoothed while preserving the edge in the input image. Specifically, the edge-preserved smoothing processing unit 17 reads the input image 12a stored in the storage unit 12 by the input-image receiving unit 16, creates the basic-structure component image 12b representing an image that is smoothed except edge, and stores it into the storage unit 12.

For example, the edge-preserved smoothing processing unit 17 can create as the basic-structure component image 12b a smoothed image that an edge is preserved by using a bilateral filter or an epsilon filter ($\epsilon$ filter) that is a filter of assigning a small weight on a pixel with a large difference in pixel value from a focused pixel of filtering, by combining weighting on a distance difference in the spatial direction and weighting in the pixel level value direction.

Moreover, for example, the edge-preserved smoothing processing unit 17 performs filtering processing on an input image by using a filter that is preliminarily set with a level-value (gradation value) range, thereby creating a plurality of filtering results. The edge-preserved smoothing processing unit 17 then can create the basic-structure component image 12b by selecting one or more from among a plurality of created level-value limited transformed images, and combining the selected images.

Figure 3:
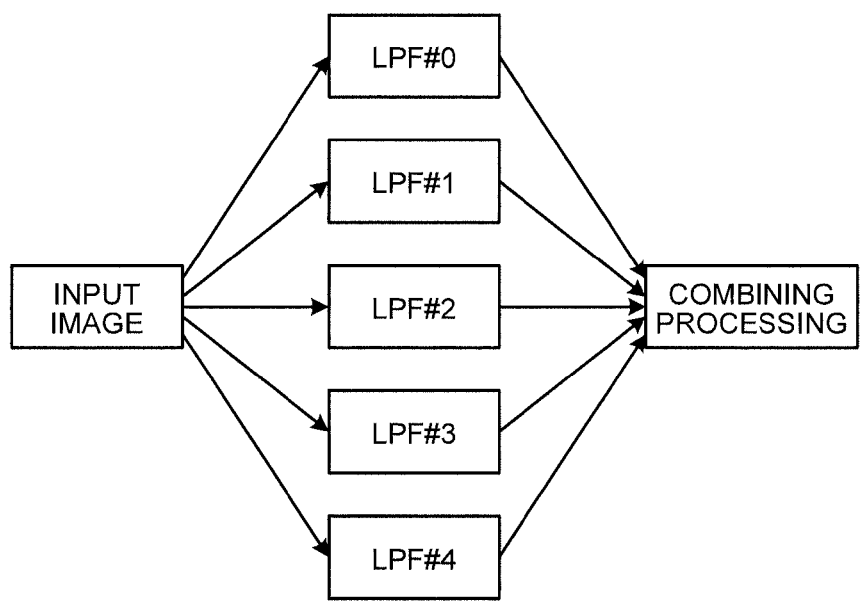
FIG. 3 is a schematic diagram that depicts an example of smoothing processing performed by an edge-preserved smoothing-processing unit.

An example of creating the basic-structure component image 12b by using the filter that is preliminarily set with the level-value (gradation value) range is explained below with reference to FIG. 3. FIG. 3 is a schematic diagram that depicts an example of smoothing processing performed by the edge-preserved smoothing-processing unit.

As depicted in FIG. 3, the edge-preserved smoothing processing unit 17 includes a plurality of low-pass filters (an LPF #0 to an LPF #4) that are one-dimensional low-pass filters (discretized filter) in the same filter size. The LPF #0 to the LPF #4 are preliminarily set with respective different level-value (gradation value) ranges, and perform smoothing processing on an input image that is input by subjecting pixels within their own set level-value ranges to the processing, thereby creating a level-value limited smoothed image. Specifically, the LPF #0 to the LPF #4 refer to each pixel of the input image that is input, acquire pixels within their own set level-value ranges, and then cumulate and average (smooth) level values of the acquired respective pixels. Each of the LPF #0 to the LPF #4 performs the above technique in each of the transverse direction and the longitudinal direction of the input image, calculates an average of values calculated from the respective directions, and gives the calculated average as a smoothed result of each pixel of the input image.

Assuming that the LPF #0 is set with 0 to 50 as level value, similarly, the LPF #1 is set with 51 to 100, the LPF #2 is set with 101 to 150, the LPF #3 is set with 151 to 200, and the LPF #4 is set with 201 to 255, the processing by the LPFs is explained below. In this case, for example, the LPF #0 acquires pixels in level 0 to 50 by referring to each pixel of the input image, and then cumulates and averages level values of the acquired respective pixels. The LPF #0 performs the above technique in each of the transverse direction and the longitudinal direction of the input image, calculates an average of values calculated from the respective directions, and creates a smoothed result of each pixel of the input image from the calculated average. In other words, the LPF #0 creates a smoothed image that the input image is smoothed with the level values "0 to 50", and stores it as a level-value limited image #0 into the storage unit 12.

Additionally, the LPF #1 to the LPF #4 perform similar processing, consequently, the LPF #1 creates a smoothed image that the input image is smoothed with the level values "51 to 100", and stores it as a level-value limited image #1 into the storage unit 12; and the LPF #2 creates a smoothed image that the input image is smoothed with the level values "101 to 150", and stores it as a level-value limited image #2 into the storage unit 12. Additionally, the LPF #3 creates a smoothed image that the input image is smoothed with the level values "151 to 200", and stores it as a level-value limited image #3 into the storage unit 12; and the LPF #4 creates a smoothed image that the input image is smoothed with the level values "201 to 255", and stores it as a level-value limited image #4 into the storage unit 12.

The edge-preserved smoothing processing unit 17 then refers to each pixel of the input image, selects a level-value limited transformed image (plain) corresponding to the level value of each pixel from the level-value limited image #0 to the level-value limited image #4 stored in the storage unit 12, and creates a composite image (frame) by combining a plurality of selected level-value limited transformed images. Accordingly, the edge-preserved smoothing processing unit 17 can create a basic-structure component image representing an image that the input image except edge is smoothed while preserving the edge in the input image. The number of LPFs and the level values to be set are not limited to those described above.

Returning to FIG. 2, the difference processing unit 18 creates a detail component image representing an image that a basic-structure component image created by the edge-preserved smoothing processing unit 17 is subtracted from an input image. Specifically, the difference processing unit 18 reads the input image 12a stored in the storage unit 12 by the input-image receiving unit 16, and the basic-structure component image 12b stored in the storage unit 12 by the edge-preserved smoothing processing unit 17, from the storage unit 12. The difference processing unit 18 then stores an image that the basic-structure component image 12b is subtracted from the read input image 12a, into the storage unit 12 as the detail component image 12c.

The multiresolution transform processing unit 19 performs the multiresolution transform processing of decomposing a detail component image created by the difference processing unit 18 into a plurality of frequency-band images. Specifically, the multiresolution transform processing unit 19 reads the detail component image 12c created by the difference processing unit 18 from the storage unit 12, decomposes the read detail component image into a low frequency component and a high frequency component, and stores them as the frequency-band images 12d into the storage unit 12. As the detail component image is decomposed here, the input image 12a is resultantly decomposed into "the basic-structure component image 12b" and "the frequency-band images 12d (the low frequency component of the detail component image, and the high frequency component of the detail component image)".

Figure 4:
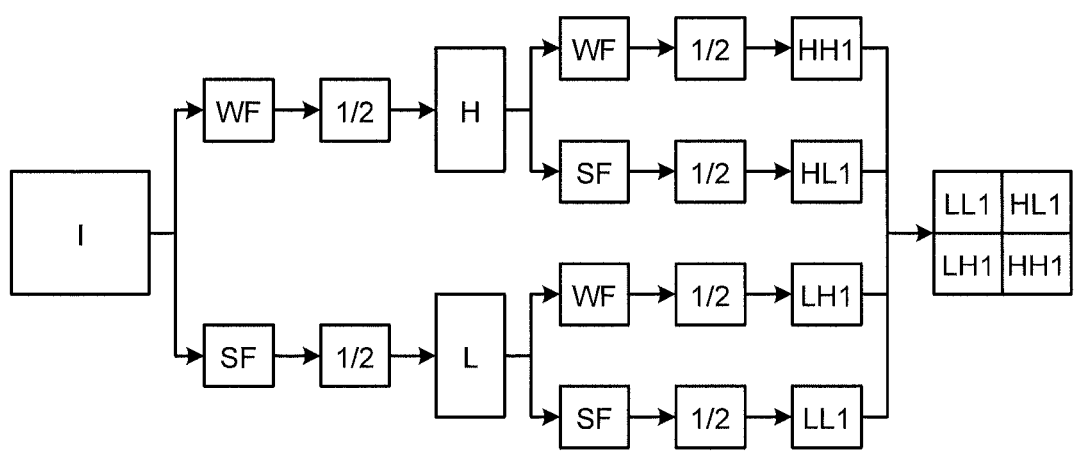
FIG. 4 is a schematic diagram for explaining multiresolution transform processing by a wavelet transform.

An example that the multiresolution transform processing unit 19 uses the wavelet transform as multiresolution transform processing is explained below with reference to FIG. 4. FIG. 4 is a schematic diagram for explaining the multiresolution transform processing by the wavelet transform.

As depicted in FIG. 4, when a detail component image (the detail component image 12c) is input into a wavelet transform unit, the multiresolution transform processing unit 19 transmits a detail component image I to a scaling filter (SF) corresponding a low-pass filter, and a wavelet filter (WF) corresponding to a high-pass filter. Although there are various forms of each filter, for example, a Haar wavelet, and a Daubechies wavelet, any form of a filter can be used, and once the filter form is determined, then the wavelet transform is to be executed by a unified method.

The multiresolution transform processing unit 19 thins a low frequency signal that has passed through the scaling filter, and a high frequency signal that has passed through the wavelet filter to ½ in the horizontal direction with a downsampling unit, and decomposes them in frequency to subband data, namely, a horizontal-direction low-frequency component L and a horizontal-direction high-frequency component H, respectively.

The multiresolution transform processing unit 19 then processes the horizontal-direction low-frequency component L with the scaling filter and the wavelet filter, thins them to ½ in the vertical direction with the downsampling unit, and decomposes them into subband data, namely, a horizontal-vertical direction low-frequency component LL1 and a horizontal-direction low-frequency vertical-direction high-frequency component LH1. Similarly, the multiresolution transform processing unit 19 processes the horizontal-direction high-frequency component H with the scaling filter and the wavelet filter, thins them to ½ in the vertical direction with the downsampling unit, and decomposes them into subband data, namely, a horizontal-vertical direction high-frequency component HH1 and the horizontal-direction high-frequency vertical-direction low-frequency component HL1.

The multiresolution transform processing unit 19 then stores the subband data, the horizontal-vertical direction low-frequency component LL1, the horizontal-direction low-frequency vertical-direction high-frequency component LH1, the horizontal-vertical direction high-frequency component HH1, and the horizontal-direction high-frequency vertical-direction low-frequency component HL1, which are obtained in this way, into the storage unit 12 as the frequency-band images 12*d*. Although the processing is explained above in detail about the wavelet transform, a low-pass filter and a high-pass filter can be set to a form different from the scaling filter and the wavelet filter to be used in the wavelet transform, and the above processing can be performed.

Returning to FIG. 2, the noise-removal processing unit 20 performs noise removal on a plurality of frequency-band images created by the multiresolution transform processing unit 19. Specifically, the noise-removal processing unit 20 reads the frequency-band images 12*d* created by the multiresolution transform processing unit 19 from the storage unit 12, performs noise removal on the read frequency-band images 12*d*, and stores a result of the noise removal as the noise-removed frequency-band images 12*e* into the storage unit 12.

Specifically explaining with reference to the above example in FIG. 4, the noise-removal processing unit 20 performs coring processing on the high frequency components "LH1, HH1, and HL1" of the frequency-band images 12*d*, thereby removing noise from the frequency-band images 12*d*. For example, the noise-removal processing unit 20 performs processing such that a coefficient value equal to or less than a threshold is all set to zero, and the other values are left as they are, with respect to coefficient values of subband data of respective frequencies, LH1, HH1, HL1, thereby removing noise from the frequency-band images 12*d*. The noise-removal processing unit 20 then stores the noise-removed image as the noise-removed frequency-band images 12*e* into the storage unit 12. Settings of the thresholds of LH1, HH1, and HL1 can be either of the same threshold or different from each other.

The inverse multiresolution transform processing unit 21 performs the inverse multiresolution transform of combining a plurality of frequency-band images of which noises are removed by the noise-removal processing unit 20, thereby creating a noise-removed detail-component image. Specifically, the inverse multiresolution transform processing unit 21 reads the noise-removed frequency-band images 12*e* (the low frequency component of the noise-removed detail-component image, and the high frequency component of the noise-removed detail-component image) created by the noise-removal processing unit 20 from the storage unit 12, and combines them. The inverse multiresolution transform processing unit 21 then stores a combined result as the noise-removed detail-component image 12*f* into the storage unit 12.

Figure 5:
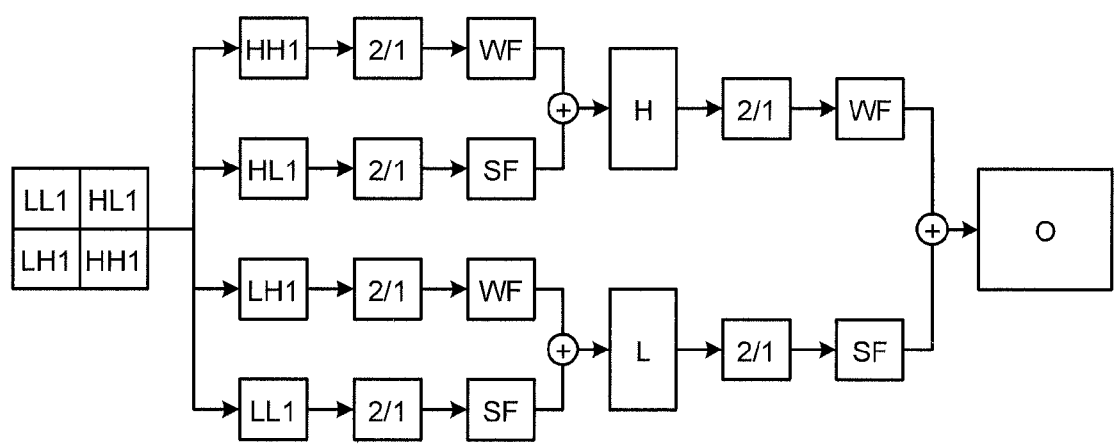
FIG. 5 is a schematic diagram for explaining inverse multiresolution transform processing by an inverse wavelet transform.

An example of performing the inverse wavelet transform by the inverse multiresolution transform processing unit 21 is explained below with reference to FIG. 5. To perform the inverse wavelet transform by the inverse multiresolution transform processing unit 21, it is assumed that the multiresolution transform processing unit 19 has performed the wavelet transform. FIG. 5 is a schematic diagram for explaining the inverse multiresolution transform processing by the inverse wavelet transform.

As depicted in FIG. 5, to pad data that is thinned by the downsampling unit to the subband data (LL1, LH1, HH1, and HL1), the inverse multiresolution transform processing unit 21 performs upsampling of 2/1 in the vertical direction. Subsequently, the inverse multiresolution transform processing unit 21 passes "HH1" through the wavelet filter, passes "HL1" through the scaling filter, and reconstructs "H" by adding up the two results. Similarly, the inverse multiresolution transform processing unit 21 passes "LH1" after upsampling through the wavelet filter, passes "LL1" after upsampling through the scaling filter, and reconstructs "L" by adding up the two results.

Furthermore, the inverse multiresolution transform processing unit 21 performs upsampling of 2/1 in the vertical direction on reconstructed "H" and "L", passes "H" after upsampling through the wavelet filter, passes "L" after upsampling through the scaling filter, and reconstructs an output image "O" by adding up the two results. In this way, the inverse multiresolution transform processing unit 21 obtains an output image by the inverse wavelet transform (the noise-removed detail-component image 12*f*).

The addition processing unit 22 adds up a basic-structure component image created by the edge-preserved smoothing processing unit 17, and a noise-removed detail-component image created by the inverse multiresolution transform processing unit 21, thereby creating an output image that noise in an input image is removed. Specifically, the addition processing unit 22 reads the basic-structure component image 12*b* created by the edge-preserved smoothing processing unit 17, and the noise-removed detail-component image 12*f* created by the inverse multiresolution transform processing unit 21, from the storage unit 12. The addition processing unit 22 then adds up the read basic-structure component image 12*b* and the read noise-removed detail-component image 12*f*, thereby creating an output image, and then displays it onto a not-depicted output unit, and/or outputs it to the dynamic range device.

Processing by Image Processing Apparatus

Figure 6:
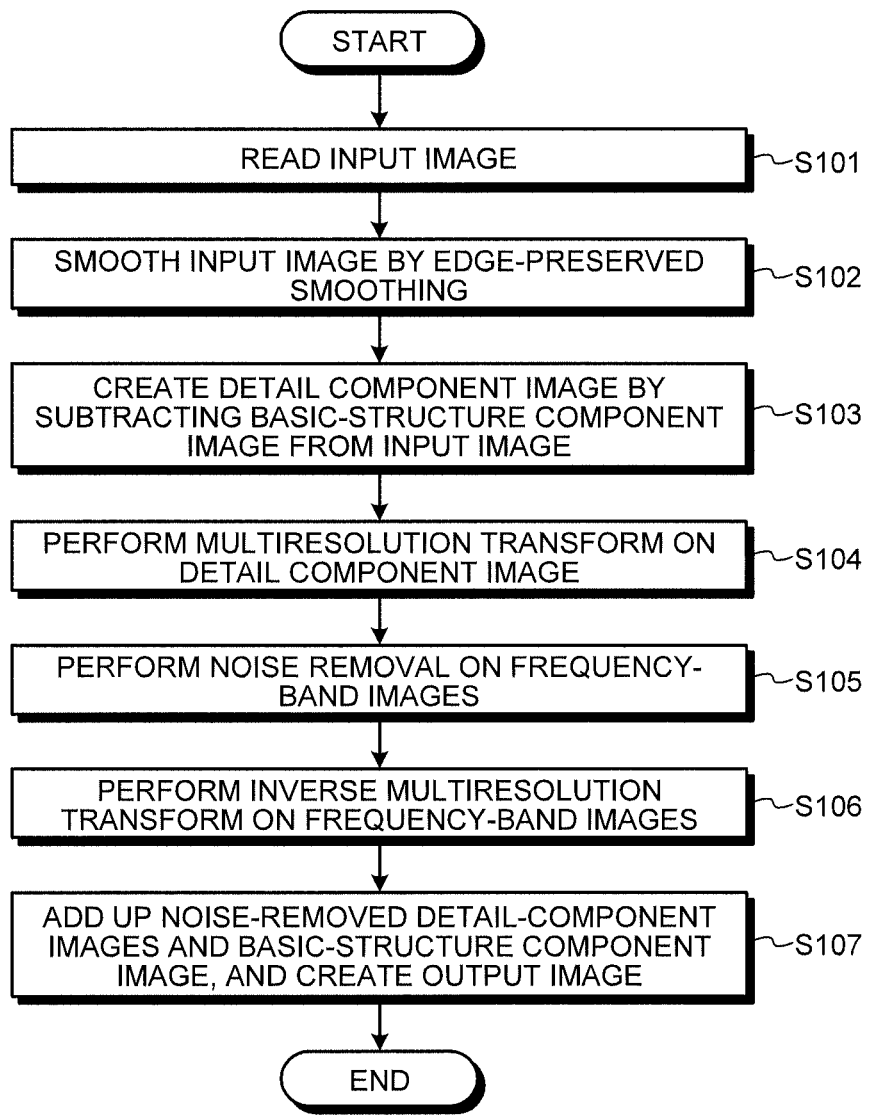
FIG. 6 is a flowchart that illustrates a flow of noise removal processing by the image processing apparatus according to the first embodiment.

Processing by the image processing apparatus is explained below with reference to FIG. 6. FIG. 6 is a flowchart that illustrates a flow of noise removal processing by the image processing apparatus according to the first embodiment.

As depicted in FIG. 6, when a noise-processing start instruction is received, the image processing apparatus 10 reads an input image from a network or a storage medium (Step S101). The image processing apparatus 10 then creates a basic-structure component image representing an image that the input image except edge is smoothed while preserving the edge in the input image, by using a plurality of low-pass filters (for example, see FIG. 3) of which level value is limited (Step S102).

Subsequently, the image processing apparatus 10 subtracts the basic-structure component image from the input image, thereby creating a detail component image (Step S103). The image processing apparatus 10 then performs multiresolution transform processing, such as the wavelet transform, on the created detail component image, thereby decomposing the detail component image into a plurality of frequency-band images (Step S104).

After that, the image processing apparatus 10 removes noise from the obtained frequency-band images, by using, for example, the coring processing (Step S105). The image processing apparatus 10 then performs inverse multiresolution transform processing, for example, the inverse wavelet transform, combines noise-removed frequency-band images, and creates a noise-removed detail-component image (Step S106).

Moreover, the image processing apparatus 10 adds the basic-structure component image obtained by smoothing the input image, and the noise-removed detail-component image, thereby creating an output image that noise in the input image is removed (Step S107).

Effects of First Embodiment

In this way, according to the first embodiment, the image processing apparatus 10 creates a basic-structure component image representing an image that the input image except edge is smoothed while preserving the edge in the input image, and creates a detail component image representing an image that the basic-structure component image is subtracted from the input image. The image processing apparatus 10 then decomposes the created detail component image into a plurality of frequency-band images, performs noise removal, and performs the inverse multiresolution transform of combining the noise-removed frequency-band images, thereby creating a noise-removed detail-component image.

In this way, the image processing apparatus 10 can perform noise removal on a high frequency image that mainly includes noise and does not include part with a large level change, such as an edge in image, and consequently, can achieve noise removal with high precision while preventing occurrence of ringing. Moreover, by using a noise-removed detail-component image for biometric authentication (for example, face-authentication, or vein-authentication), authentication processing with high precision can be performed, and impersonation can be securely prevented.

Moreover, according to the first embodiment, the image processing apparatus 10 can create an output image that noise in an input image is removed by adding up a created basic-structure component image and a created noise-removed detail-component image. As a result, an image that small noises are removed can be created, and the image can be output to the dynamic range device, so that noise removal from a digital image can be effectively performed regardless of moving image or still image.

Furthermore, according to the first embodiment, the image processing apparatus 10 decomposes a created detail component image into a plurality of frequency-band images by performing the wavelet transform. The image processing apparatus 10 then performs the inverse wavelet transform on a plurality of noise-removed frequency-band images, thereby creating a noise-removed detail-component image. As a result, even when using the wavelet transform that is generally used as a noise removal method, noise removal with high precision can be achieved.

[b] Second Embodiment

Although an embodiment according to the present invention has been explained above, the present invention can be implemented in various forms in addition to the embodiment described above. Therefore, different embodiments are explained below.

Recursive Multiresolution Processing

For example, the first embodiment is explained above in the example that subband data of the horizontal-vertical direction low-frequency component LL1, the horizontal-direction low-frequency vertical-direction high-frequency component LH1, the horizontal-vertical direction high-frequency component HH1, and the horizontal-direction high-frequency vertical-direction low-frequency component HL1 are obtained as the frequency-band images 12d by the wavelet transform. Not limited by this, for example, recursive multiresolution processing can be repeated on subband data of a specific frequency band (for example, an LLn component (where, n denotes the number of times of repetition).

Figure 7:
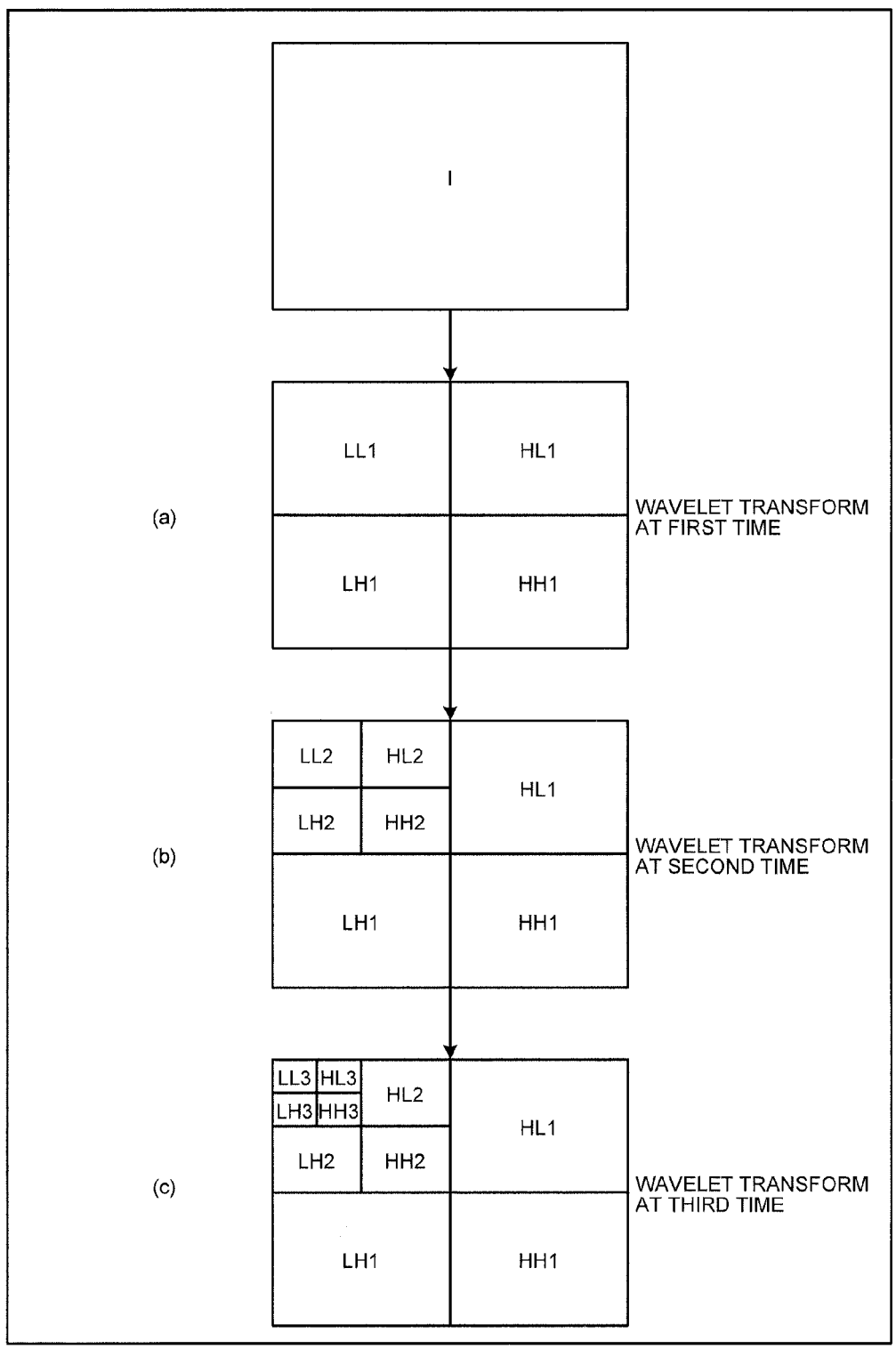
FIG. 7 is a schematic diagram for explaining recursive multiresolution processing.

Specifically explaining with reference to FIG. 7, the image processing apparatus 10 can obtain an image depicted in (a) of FIG. 7 by executing the wavelet transform (the first time of the wavelet transform) depicted in FIG. 4. The image processing apparatus 10 can then obtain an image depicted in (b) of FIG. 7 by executing again the wavelet transform (the second time of the wavelet transform) only on the horizontal-vertical low frequency component LL1. Furthermore, the image processing apparatus 10 can obtain an image depicted in (c) of FIG. 7, by executing again the wavelet transform (the third time of the wavelet transform) only on the horizontal-vertical low frequency component LL2.

In this way, the image processing apparatus 10 can extract smaller noises by repeating the recursive multiresolution processing on subband data in a specific frequency band. As a result, during noise removal processing, extracted smaller noises can be removed, so that a noise-removed detail-component image and an output image both with high image quality can be created, and noise removal with higher precision can be achieved.

Moreover, when the recursive multiresolution processing is executed, the noise-removal processing unit 20 can change the threshold of the coring processing, depending on the number of times n of the repetition processing of LHn, HHn, and HLn. FIG. 7 is a schematic diagram for explaining the recursive multiresolution processing.

Example of Multiresolution Processing

Although the first embodiment is explained above in a case where the wavelet transform is used as multiresolution transform processing, it is not limited to this. For example, a Karhunen-Loeve (KL) transform, a cosine transform, or a Fourier transform, any one of techniques of such frequency transforms can be used. In such case, to perform inverse multiresolution transform processing, an inverse transform of each of them can be performed.

System Configuration

Among the various kinds of processing explained in the embodiments, all or part of the processing explained as configured to be automatically performed (for example, the receiving processing and the reading processing of input image) can be manually performed. In addition, information including the process procedures, the control procedures, the specific names, and various data and parameters described in the above description or depicted in the drawings can be arbitrarily changed unless otherwise specified.

The components of each device depicted in the drawings are conceptual for describing functions, and not necessarily to be physically configured as depicted in the drawings. In other words, concrete forms of distribution and integration of the units are not limited to those depicted in the drawings, and all or part of the units can be configured to be functionally or physically distributed and integrated in an arbitrary unit (for example, the edge-preserved smoothing processing unit 17 and the difference processing unit 18 are integrated) depending on various loads and conditions in use. Furthermore, all or an arbitrary part of the processing functions performed by the respective units can be implemented by a Central Processing Unit (CPU) and a program to be executed by the CPU, or can be implemented as hardware by wired logic.

Program

The various kinds of processing explained above in the embodiments can be implemented by executing a preliminarily prepared program by a computer system, such as a personal computer and a work station. Therefore, a computer system configured to execute a program having functions similar to those of the above embodiments is explained below as another embodiment.

Figure 8:
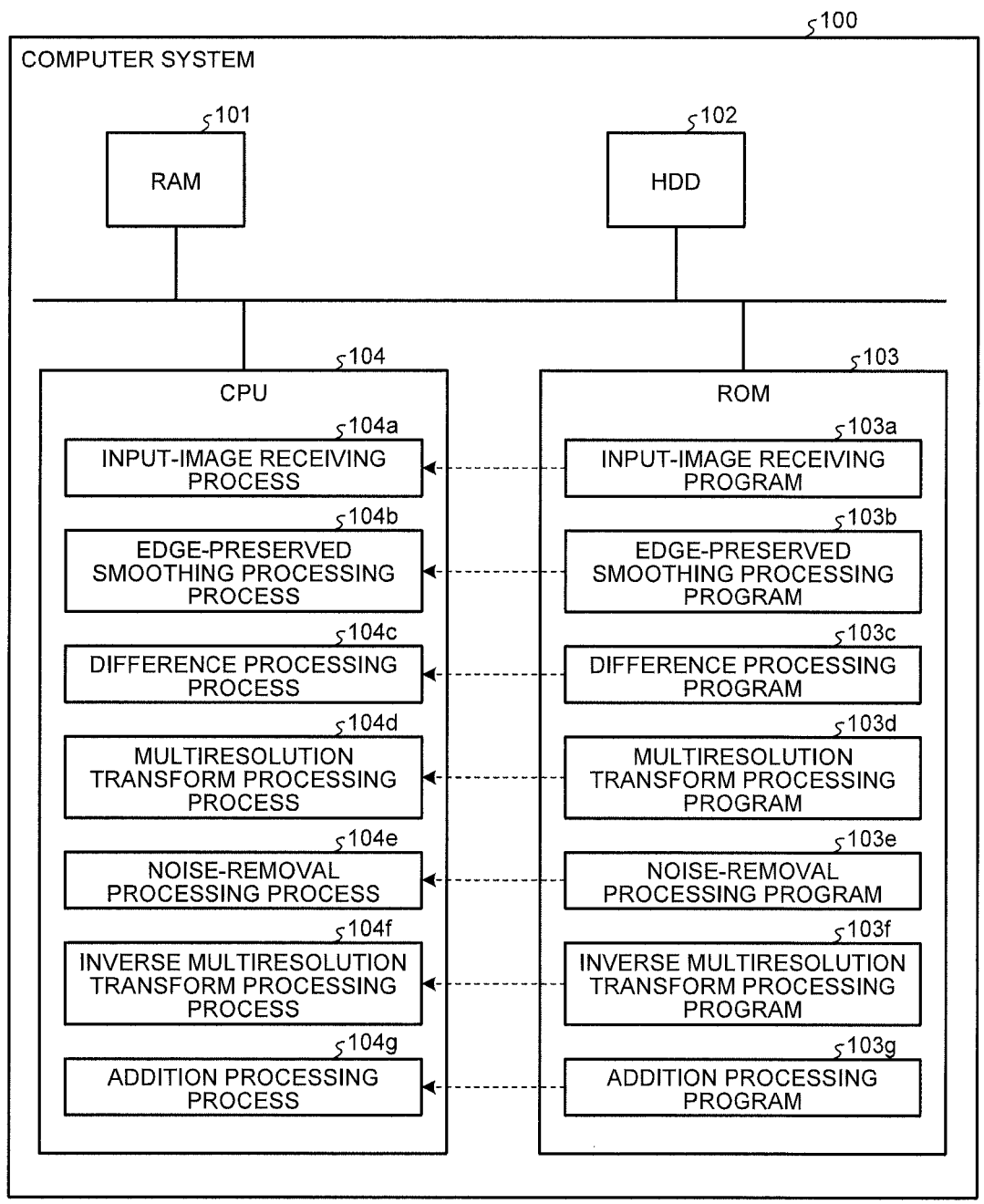
FIG. 8 is a schematic diagram that depicts an example of a computer system that executes an image processing program.
Figure 9A:
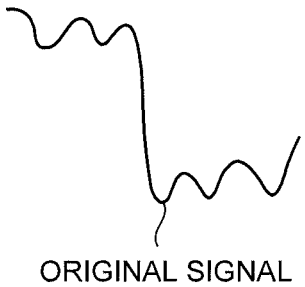
FIG. 9A is a schematic diagram that depicts an example of an input image that is input as a wavelet transform subject according to a conventional technology.
Figure 9B:
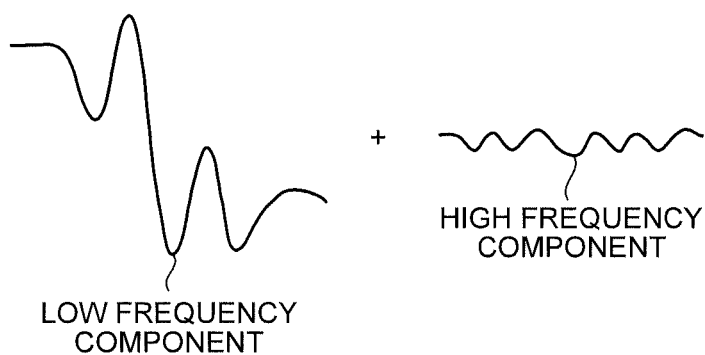
FIG. 9B is a schematic diagram that depicts an example that an input image is decomposed through a wavelet transform according to the conventional technology.
Figure 9C:
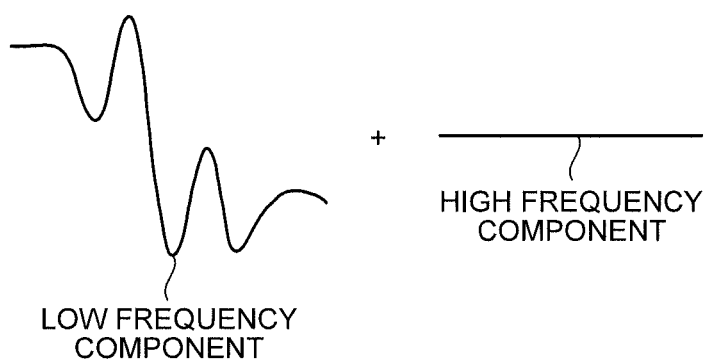
FIG. 9C is a schematic diagram for explaining noise removal using the wavelet transform according to the conventional technology.
Figure 9D:
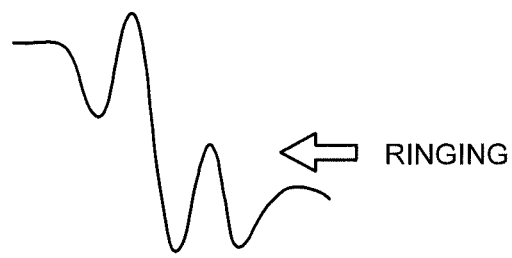
FIG. 9D is a schematic diagram that depicts an example of an output image after noise is removed by using the wavelet transform according to the conventional embodiment.

FIG. 8 is a schematic diagram that depicts an example of a computer system that executes an image processing program. As depicted in FIG. 8, a computer system 100 includes a Random Access Memory (RAM) 101, an HDD 102, a Read-Only Memory (ROM) 103, and a CPU 104. The RAM 103 preliminarily stores therein programs that perform functions similar to the above embodiments. Precisely, as depicted in FIG. 8, an input-image receiving program 103a, an edge-preserved smoothing processing program 103b, a difference processing program 103c, a multiresolution transform processing program 103d, a noise-removal processing program 103e, an inverse multiresolution transform processing program 103f, and an addition processing program 103g are preliminarily stored.

The CPU 104 then reads and executes the programs 103a to 103g, thereby turning them into an input-image receiving process 104a, an edge-preserved smoothing processing process 104b, a difference processing process 104c, a multiresolution transform processing process 104d, a noise-removal processing process 104e, an inverse multiresolution transform processing process 104f, and an addition processing process 104g, respectively, as depicted in FIG. 8.

The input-image receiving process 104a corresponds to the input-image receiving unit 16 depicted in FIG. 2; similarly, the edge-preserved smoothing processing process 104b corresponds to the edge-preserved smoothing processing unit 17; and the difference processing process 104c corresponds to the difference processing unit 18. The multiresolution transform processing process 104d corresponds to the multiresolution transform processing unit 19; the noise-removal processing process 104e corresponds to the noise-removal processing unit 20; the inverse multiresolution transform processing process 104f corresponds to the inverse multiresolution transform processing unit 21; and the addition processing process 104g corresponds to the addition processing unit 22.

In the HDD 102, similarly to FIG. 2, the input image 12a, the basic-structure component image 12b, the detail component image 12c, the frequency-band image 12d, the noise-removed frequency-band image 12e, the noise-removed detail-component image 12f, and the like are stored, as images created through the respective control processes by the CPU 104.

The above programs 103a to 103g are not necessarily stored in the ROM 103; and can be stored in, for example, a "portable physical medium" to be inserted into the computer system 100, such as a Flexible Disk (FD), a CD-ROM, a magneto-optical (MO) disk, a DVD, a magneto-optical disk, and an integrated circuit (IC) card, in addition, a "fixed physical medium" to be provided inside or outside the computer system 100, such as an HDD, and furthermore, "another computer" to be connected to the computer system 100 via a public line, the Internet, a local area network (LAN), a wide area network (WAN), and the like; and then can be executed by reading the programs from them.

According to the image processing apparatus disclosed by the present application, while preventing occurrence of ringing, noise removal with high precision can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus that removes noise from an input image, the image processing apparatus comprising:
   a memory; and
   a processor coupled to the memory, wherein the processor executes a process comprising:
   creating a basic-structure component image representing an image that has the input image except an edge smoothed while preserving the edge in the input image;
   creating a detail component image representing an image by subtracting the basic-structure component image created from the input image;
   performing a multiresolution transform processing in which the detail component image is decomposed to a low frequency component and a high frequency component and each of a horizontal direction low frequency component and a horizontal direction high frequency component in each of the low frequency component and the high frequency component are decomposed to a vertical direction low frequency component and a vertical direction high frequency component;
   performing noise removal on each vertical direction high frequency; and
   performing an inverse multiresolution transform processing in which the vertical direction high frequency component from which noises are removed and the vertical direction low frequency component are combined, the horizontal direction low frequency component and the horizontal direction high frequency component are combined and the low frequency component and the high frequency component are combined, to create a noise-removed detail-component image.

2. The image processing apparatus according to claim 1, comprising:
   creating an output image having noise in the input image removed, by adding the basic-structure component image, and creating a corresponding noise-removed detail-component image.

3. The image processing apparatus according to claim 1, wherein
   the performing includes performing a wavelet transform as the multiresolution transform processing, and
   the performing includes performing, to create the noise-removed detail-component image, an inverse wavelet transform as the inverse multiresolution transform processing.

4. The image processing apparatus according to claim 1, wherein the performing includes decomposing the image in the specific frequency band into the vertical direction low frequency component and the vertical direction high frequency component, by executing repeatedly the multiresolution transform processing a predetermined number of times on an image in a specific frequency-band image among the vertical direction low frequency component and the vertical direction high frequency component obtained by the multiresolution transform processing.

5. An image processing method that removes noise from an input image, the image processing method comprising:
   creating a basic-structure component image representing an image that the input image except edge is smoothed while preserving the edge in the input image;
   creating a detail component image representing an image that the basic-structure component image is subtracted from the input image;

performing a multiresolution transform processing in which the detail component image is decomposed to a low frequency component and a high frequency component and each of a horizontal direction low frequency component and a horizontal direction high frequency component in each of the low frequency component and the high frequency component are decomposed to a vertical direction low frequency component and a vertical direction high frequency component;

performing noise removal on the each vertical direction high frequency component; and performing an inverse multiresolution transform processing in which the vertical direction high frequency component from which noises are removed and the vertical direction low frequency component are combined, the horizontal direction low frequency component and the horizontal direction high frequency component are combined and the low frequency component and the high frequency component are combined, to create a noise-removed detail-component image.

6. The image processing apparatus according to claim 1, wherein the performing includes creating the vertical direction low frequency component and the vertical direction high frequency component by performing recursively multiresolution transform processing, and performing noise removal on each of the vertical direction high frequency components.

\* \* \* \* \*